US011085641B2

United States Patent
Dudebout et al.

(10) Patent No.: US 11,085,641 B2
(45) Date of Patent: Aug. 10, 2021

(54) PLUG RESISTANT EFFUSION HOLES FOR GAS TURBINE ENGINE

(71) Applicant: HONEYWELL INTERNATIONAL INC., Morris Plains, NJ (US)

(72) Inventors: Rodolphe Dudebout, Phoenix, AZ (US); Nagaraja S. Rudrapatna, Chandler, AZ (US); Atul Verma, Tucson, AZ (US); David Chou, Phoenix, AZ (US); Christopher Zollars, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 135 days.

(21) Appl. No.: 16/200,848

(22) Filed: Nov. 27, 2018

(65) Prior Publication Data

US 2020/0166211 A1 May 28, 2020

(51) Int. Cl.
*F23R 3/04* (2006.01)

(52) U.S. Cl.
CPC ...... *F23R 3/04* (2013.01); *F23R 2900/03041* (2013.01); *F23R 2900/03042* (2013.01)

(58) Field of Classification Search
CPC .. F23R 3/002; F23R 3/04; F23R 3/045; F23R 3/06; F23R 3/12; F23R 2900/03041–03045; F05D 2260/202–203; F02C 7/18; F23M 5/08; F23M 5/085
See application file for complete search history.

(56) References Cited

U.S. PATENT DOCUMENTS

| | | |
|---|---|---|
| 4,684,323 A | 8/1987 | Field |
| 4,738,588 A | 4/1988 | Field |
| 5,382,133 A | 1/1995 | Moore et al. |
| 5,419,681 A | 5/1995 | Lee |
| 5,609,779 A | 3/1997 | Crow et al. |
| 5,771,577 A | 6/1998 | Gupta et al. |
| 6,241,468 B1 | 6/2001 | Lock et al. |
| 7,997,868 B1 | 8/2011 | Liang |
| 8,070,440 B2 | 12/2011 | Briere |

(Continued)

FOREIGN PATENT DOCUMENTS

| | | |
|---|---|---|
| DE | 10236676 A1 | 2/2004 |
| DE | 102013221286 A1 | 4/2015 |

(Continued)

*Primary Examiner* — Craig Kim
(74) *Attorney, Agent, or Firm* — Lorenz & Kopf, LLP

(57) ABSTRACT

A combustor for a gas turbine engine includes a first liner having a first surface, a second surface opposite the first surface, and a wall having a thickness defined between the first surface and the second surface. The first liner defines a plurality of effusion cooling holes, and at least one of the effusion cooling holes includes an inlet section spaced apart from the first surface, and a converging section downstream of the inlet section. The inlet section and the converging section are each defined so as to be outside of the thickness. The at least one of the effusion cooling holes includes a metering section downstream of the converging section and a portion of the metering section is defined within the thickness. The at least one of the effusion cooling holes includes an outlet section downstream of the metering section. The outlet section is proximate to the second surface.

13 Claims, 8 Drawing Sheets

(56) References Cited

U.S. PATENT DOCUMENTS

| | | |
|---|---|---|
| 9,328,616 B2 | 5/2016 | Heselhaus |
| 9,416,971 B2 | 8/2016 | Xu |
| 9,696,035 B2 | 7/2017 | Starkweather et al. |
| 9,696,036 B2 | 7/2017 | Clemen |
| 9,759,069 B2 | 9/2017 | Nita et al. |
| 9,765,968 B2 | 9/2017 | Gage et al. |
| 9,957,811 B2 | 5/2018 | Hucker et al. |
| 2004/0213664 A1* | 10/2004 | Wilusz ............. F01D 11/24 415/116 |
| 2014/0161585 A1 | 6/2014 | Amess et al. |
| 2014/0338347 A1* | 11/2014 | Gage ................. F23R 3/16 60/754 |
| 2016/0061451 A1* | 3/2016 | Dudebout ........... F01D 9/023 60/806 |
| 2016/0356498 A1 | 12/2016 | Gerendas |
| 2017/0176006 A1 | 6/2017 | Gerendas |
| 2018/0306114 A1 | 10/2018 | Dudebout et al. |
| 2019/0017440 A1* | 1/2019 | Porter ............... F23R 3/002 |

FOREIGN PATENT DOCUMENTS

| | | |
|---|---|---|
| EP | 0985802 A1 | 3/2000 |
| EP | 2759772 A1 | 7/2014 |
| EP | 3061911 A1 | 8/2016 |
| EP | 3182010 A1 | 6/2017 |
| JP | 2013167205 A | 8/2013 |
| WO | 9525932 A1 | 9/1995 |
| WO | 9837310 A1 | 8/1998 |

\* cited by examiner

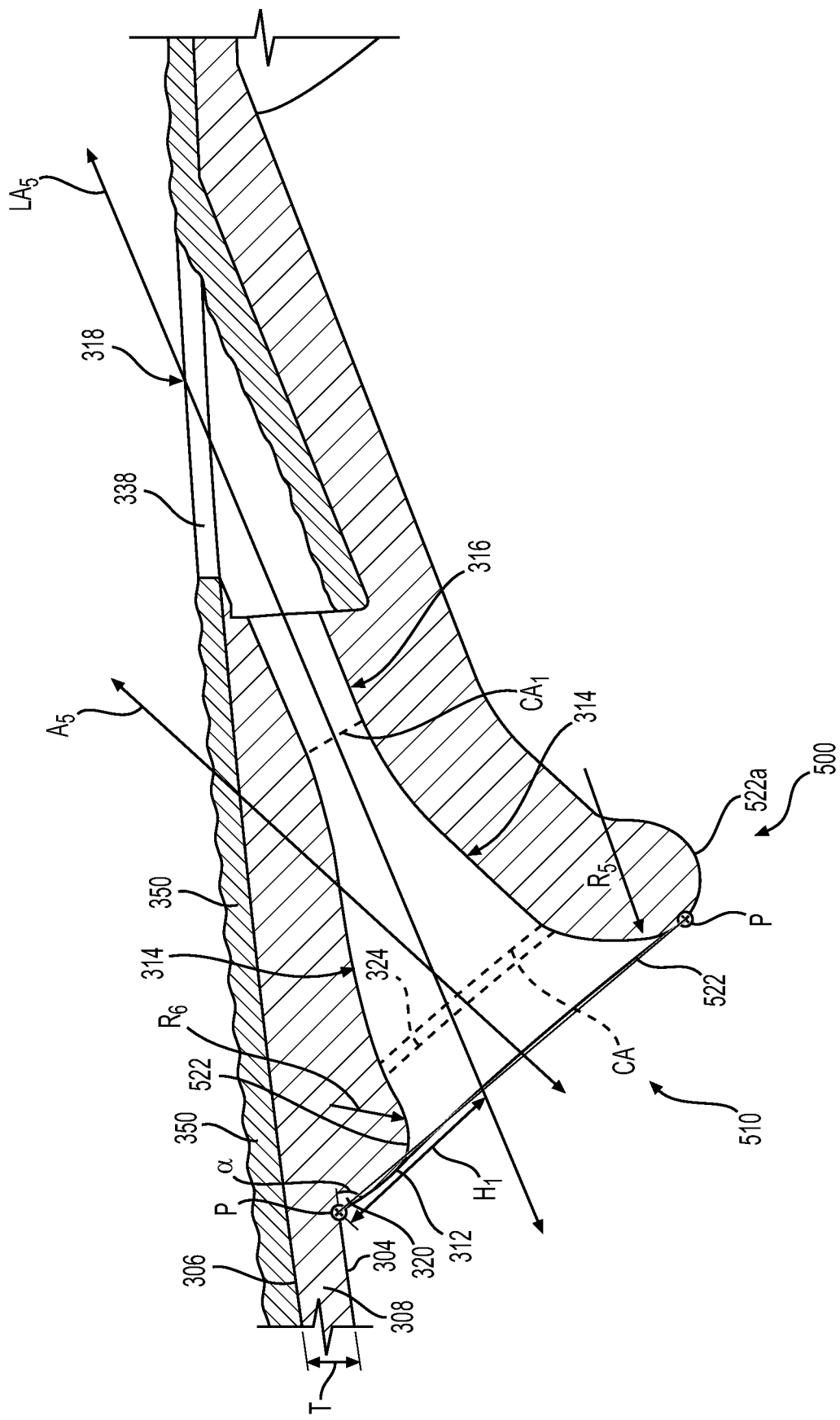

PLUG RESISTANT EFFUSION HOLES FOR GAS TURBINE ENGINE

TECHNICAL FIELD

The present disclosure generally relates to gas turbine engines, and more particularly relates to plug resistant effusion cooling holes for a combustor of a gas turbine engine.

BACKGROUND

Gas turbine engines may be employed to power various devices. For example, a gas turbine engine may be employed to power a mobile platform, such as an aircraft. Generally, gas turbine engines have an engine core, in which gas is combusted to generate a hot combustive gas flow. Certain components of the gas turbine engine, such as the combustor liner, include portions that experience the full effect of the hot combustive gas flow. In order to regulate the temperature of these components, and therefore reduce the impact of the hot combustive gas flow, one or more cooling features may be employed. In certain operating environments, such as desert operating environments, the gas turbine engine may ingest fine sand and dust particles. These ingested fine sand and dust particles may pass through portions of the gas turbine engine and may accumulate in cooling features. The accumulation of the fine sand and dust particles in the cooling features may impede the cooling of the component, which in turn, may reduce the life of the component leading to increased repair costs and downtime for the gas turbine engine.

Accordingly, it is desirable to provide a cooling feature, such as an effusion cooling hole, for a component of a gas turbine engine, such as a combustor liner of a combustor, which is resistant to plugging or the accumulation of fine sand and dust particles. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a combustor for a gas turbine engine. The combustor includes a first liner having a first surface, a second surface opposite the first surface, and a wall having a thickness defined between the first surface and the second surface. The combustor includes a second liner forming a combustion chamber with the second side of the first liner, and the combustion chamber is configured to receive an air-fuel mixture for combustion. The combustor includes the first liner defining a plurality of effusion cooling holes configured to form a film of cooling fluid on the second surface of the first liner. At least one of the plurality of effusion cooling holes includes an inlet section spaced apart from the first surface, and a converging section fluidly coupled downstream of the inlet section. The inlet section and the converging section are each defined off of the first surface so as to be outside of the thickness of the wall. The at least one of the plurality of effusion cooling holes includes a metering section fluidly coupled downstream of the converging section and a portion of the metering section is defined within the thickness of the wall. The at least one of the plurality of effusion cooling holes includes an outlet section fluidly coupled downstream of the metering section. The outlet section is positioned proximate to the second surface and configured to form the film of cooling air on the second surface.

Further provided according to various embodiments is a combustor for a gas turbine engine. The combustor includes a first liner having a first surface, a second surface opposite the first surface, and a wall having a thickness defined between the first surface and the second surface. The combustor includes a second liner forming a combustion chamber with the second side of the first liner, and the combustion chamber is configured to receive an air-fuel mixture for combustion. The combustor includes the first liner defining a plurality of effusion cooling holes configured to form a film of cooling fluid on the second surface of the first liner. At least one of the plurality of effusion cooling holes includes an inlet section spaced apart from the first surface. The inlet section includes a bellmouth defined about an opening. The at least one of the plurality of effusion cooling holes includes a converging section fluidly coupled downstream of the opening. The inlet section and the converging section are each defined off of the first surface so as to be outside of the thickness of the wall. The at least one of the plurality of effusion cooling holes also includes a metering section fluidly coupled downstream of the converging section and a portion of the metering section is defined within the thickness of the wall. The at least one of the plurality of effusion cooling holes includes an outlet section fluidly coupled downstream of the metering section. A portion of the outlet section is defined within the thickness of the wall, and the outlet section positioned proximate to the second surface and configured to form the film of cooling air on the second surface.

Also provided according to various embodiments is a combustor for a gas turbine engine. The combustor includes a first liner having a first surface, a second surface opposite the first surface, and a wall having a thickness defined between the first surface and the second surface. The combustor includes a second liner forming a combustion chamber with the second side of the first liner, and the combustion chamber is configured to receive an air-fuel mixture for combustion. The combustor includes the first liner defining a plurality of effusion cooling holes configured to form a film of cooling fluid on the second surface of the first liner. The combustor includes at least one of the plurality of effusion cooling holes. The at least one of the plurality of effusion cooling holes includes an inlet section spaced apart from the first surface. The inlet section includes a bellmouth defined about an opening and the opening is elliptical, with a major axis of the opening oblique to a longitudinal axis of the at least one of the plurality of effusion cooling holes. The at least one of the plurality of effusion cooling holes includes a bump proximate the bellmouth of the inlet section and a converging section fluidly coupled downstream of the opening. The inlet section and the converging section are each defined off of the first surface so as to be outside of the thickness of the wall. The at least one of the plurality of effusion cooling holes includes a metering section fluidly coupled downstream of the converging section and a portion of the metering section is defined within the thickness of the wall. The at least one of the plurality of effusion cooling holes includes an outlet section fluidly coupled downstream of the metering section, and a portion of the outlet section is defined within the thickness of the wall. The outlet section is positioned proximate to the second surface and configured to form the film of cooling air on the second surface.

DESCRIPTION OF THE DRAWINGS

The exemplary embodiments will hereinafter be described in conjunction with the following drawing figures, wherein like numerals denote like elements, and wherein:

FIG. 7B is a cross-sectional view of another plug resistant effusion cooling hole for use with the exemplary combustor liner of the combustion section of FIG. 2 in accordance with various embodiments.

DETAILED DESCRIPTION

Figure 1:
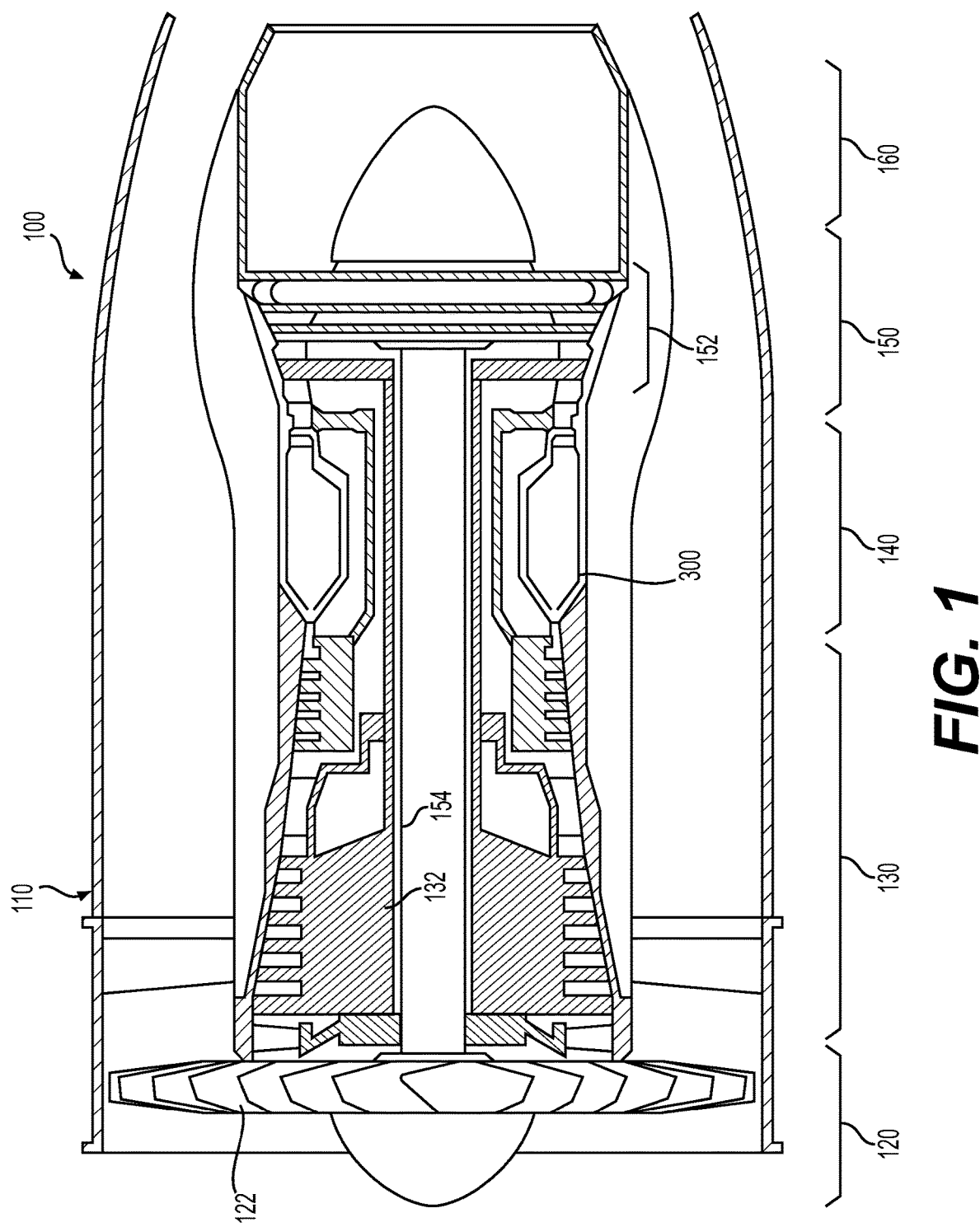
FIG. 1 is a schematic cross-sectional illustration of a gas turbine engine, which includes a combustion section having a plurality of exemplary plug resistant effusion cooling holes in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of component associated with a gas turbine engine that would benefit from having a particle plugging resistant cooling feature, such as an effusion hole, and the plug resistant effusion cooling hole described herein for a combustor of a gas turbine engine is merely one exemplary embodiment according to the present disclosure. In addition, while the plug resistant effusion cooling hole is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

FIG. 1 is a simplified, cross-sectional view of a gas turbine engine 100 according to an exemplary embodiment. The gas turbine engine 100 may be disposed in an engine case 110 and may include a fan section 120, a compressor section 130, a combustor section 140, a turbine section 150, and an exhaust section 160. As will be discussed, the combustor section 140 includes one or more plug resistant effusion holes or effusion cooling holes 300, which provide cooling for a portion of the combustor section 140 while reducing plugging of the effusion cooling holes 300 with ingested sand or fine dust particles. By providing the effusion cooling holes 300, the temperature of the portion of the combustor section 140 is regulated, which improves useful life and reduces maintenance costs.

With continued reference to FIG. 1, the fan section 120 may include a fan 122, which draws in and accelerates at least a portion of the air into the compressor section 130. The compressor section 130 may include a series of compressors 132 that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through the exhaust section 160. In one embodiment, the turbines 152 rotate to drive equipment in the gas turbine engine 100 via concentrically disposed shafts or spools. Specifically, the turbines 152 may drive the compressors 132 via one or more rotors 154. FIG. 1 depicts one exemplary configuration, and other embodiments may have alternate arrangements. The exemplary embodiments discussed herein are not limited to use in conjunction with a particular type of turbine engine.

Figure 2:
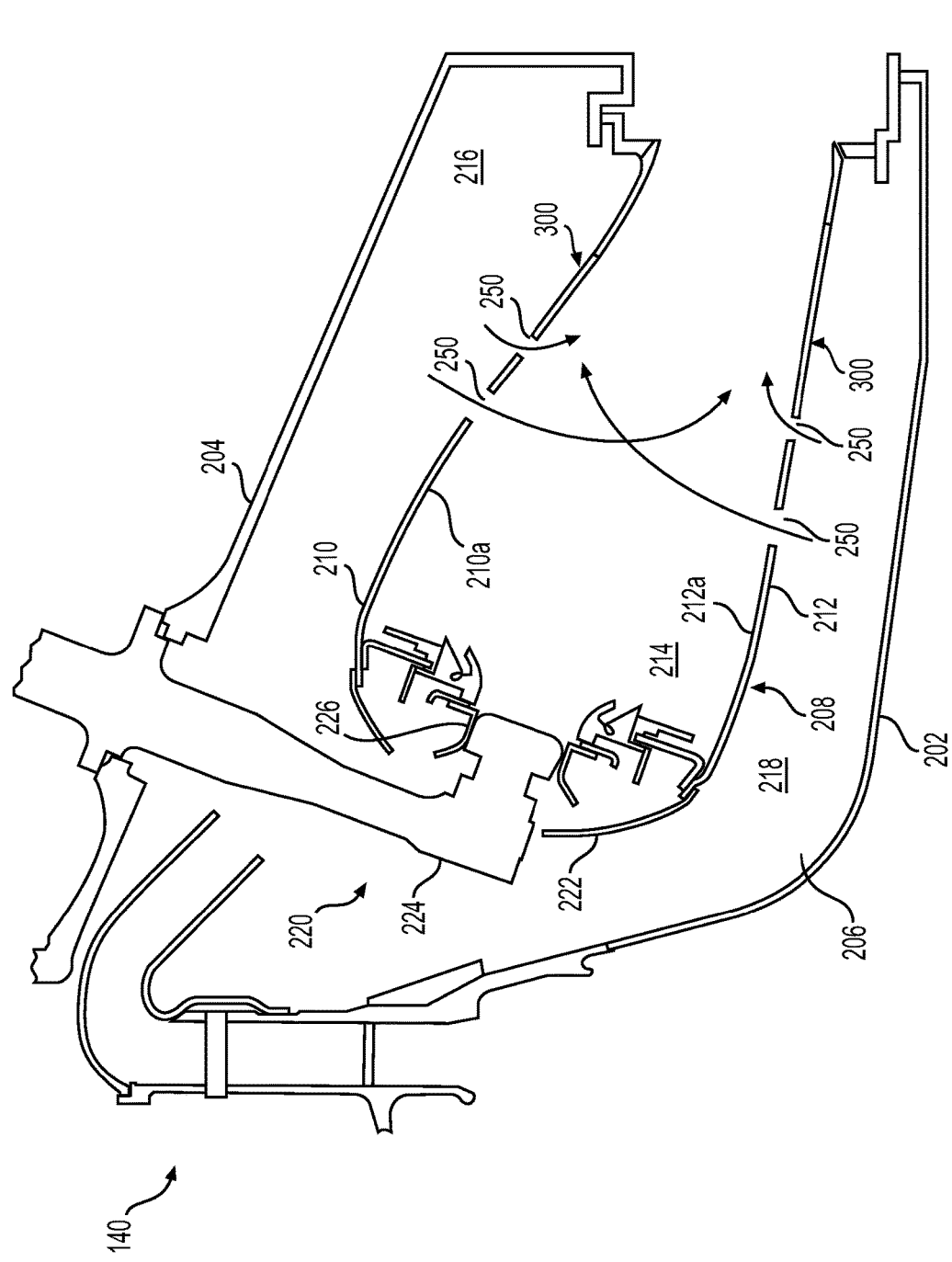
FIG. 2 is a partial cross-sectional view of the combustion section of FIG. 1, which includes the plurality of plug resistant effusion cooling holes, in accordance with various embodiments.

FIG. 2 is a more detailed cross-sectional view of the combustor section 140 of FIG. 1. In FIG. 2, only half the cross-sectional view is shown; the other half would be substantially rotationally symmetric about a centerline and axis of rotation 200. The combustor section 140 of FIG. 2 is an annular combustor section 140, although aspects of exemplary embodiments described herein may also be useful in can combustors, canannular combustors, and other types of combustors. Exemplary embodiments are applicable to both commercial and military gas turbine engines and auxiliary power units. Moreover, as mentioned previously, exemplary embodiments may find beneficial uses in many industries, including aerospace and particularly in high performance aircraft, as well as automotive, marine and power generation.

The combustor section 140 includes a radially inner case 202 and a radially outer case 204 concentrically arranged with respect to the inner case 202. The inner and outer cases 202, 204 circumscribe the axially extending engine centerline 200 to define an annular pressure vessel 206. The combustor section 140 also includes a combustor 208 residing within the annular pressure vessel 206. The combustor 208 is defined by an outer liner 210 and an inner liner 212 that is circumscribed by the outer liner 210 to define an annular combustion chamber 214. The combustor liners 210, 212 cooperate with cases 202, 204 to define respective outer and inner air plenums 216, 218.

The combustor 208 includes a front end assembly 220 comprising a dome assembly 222, fuel injectors 224, and fuel injector guides 226. One fuel injector 224 and one fuel injector guide 226 are shown in the partial cross-sectional view of FIG. 2, although a number of fuel injectors 224 may be disposed about the combustor 208. Each fuel injector 224 introduces a swirling, intimately blended fuel-air mixture that supports combustion in the combustion chamber 214.

In one exemplary embodiment, the combustor 208 may be a rich burn, quick quench, lean burn (RQL) combustor, although further exemplary embodiments may provide other types of combustion processes. During operation, a portion of the pressurized air enters the combustion chamber 214 by way of passages in the front end assembly 220. The air is intermixed with fuel introduced through the fuel injectors 224 and ignited by an igniter (not shown) to support initial combustion. Additional air for further combustion flows from the plenum 216, 218 into the combustion chamber 214 through air admission holes 250 in the outer and inner liner 210, 212. Two rows of air admission holes 250 are depicted in FIG. 2, although other arrangements may be provided. As noted above, the resulting combustion gases exit the combustion chamber 214 and are directed to the turbine section for energy extraction.

As also noted above, the engine components are subject to extremely high temperatures resulting from the combustion process. If unaddressed, the extreme heat may affect the useful life of components and/or impact the maximum operating temperature of the engine. As such, cooling features and/or mechanisms may be provided to maintain temperatures at acceptable levels. The effusion cooling holes 300 are examples of a cooling feature that maintains temperatures of the combustor liner 210, 212 at acceptable levels.

Figure 3:
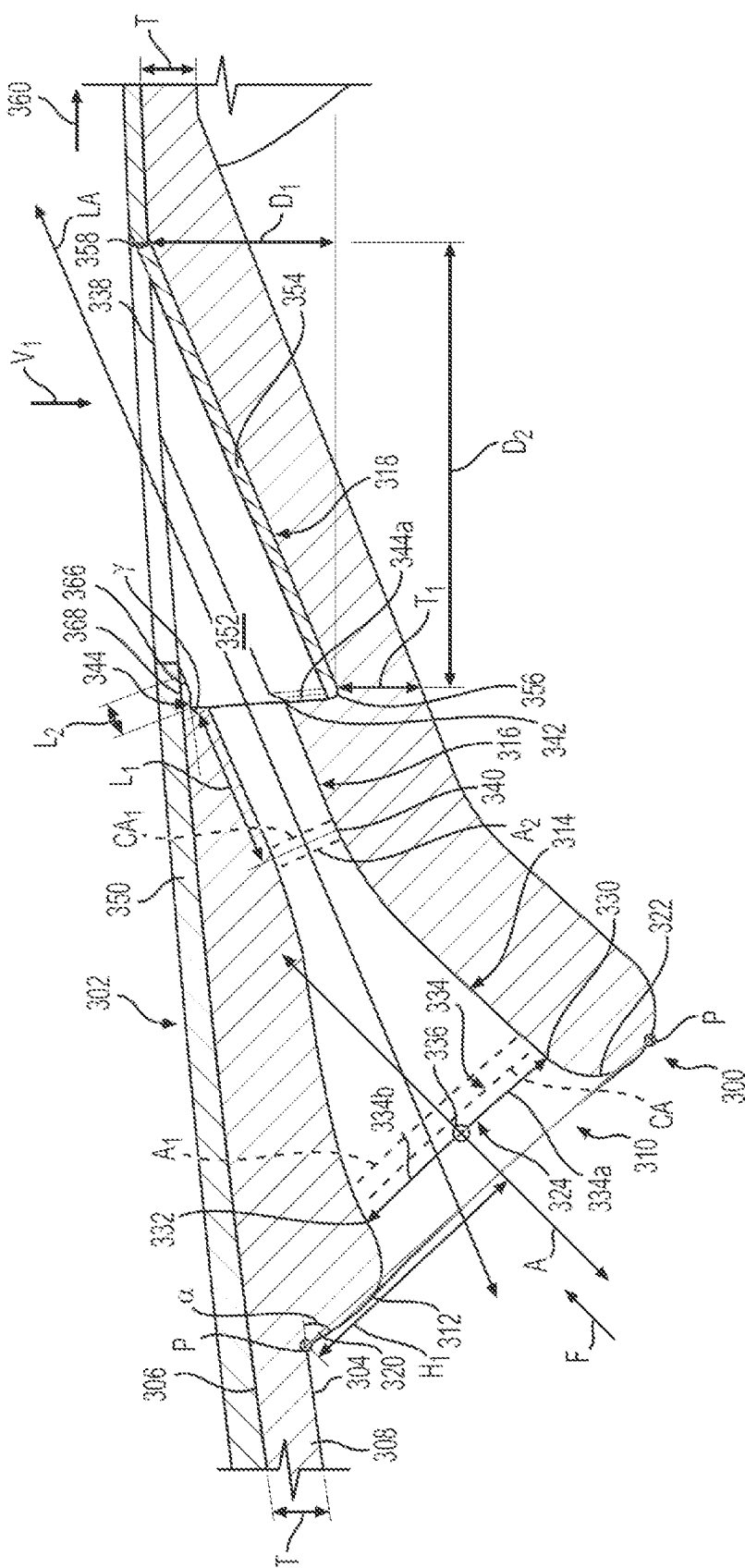
FIG. 3 is a cross-sectional view of one of the plug resistant effusion cooling holes associated with an exemplary combustor liner of the combustion section of FIG. 2 in accordance with various embodiments.

In one example, the effusion cooling holes 300 are relatively small, closely spaced holes formed in various engine components, including one or both of the combustor liners 210, 212. In this example, the effusion cooling holes 300 are defined within the combustor liners 210, 212 to provide cooling to the combustor liners 210, 212. The effusion cooling holes 300 may also be referred to as "angled cooling holes." These effusion cooling holes 300 serve to direct a flow of relatively cool air from the plenums 216, 218, through the combustor liner 210, 212, and onto an inner surface 210a, 212a of the combustor liner 210, 212, respectively. As best shown in FIG. 3, the effusion cooling holes 300 are typically angled at, for example, about 1 degree to about 55 degrees (for example, about 45 degrees) to the inner surface 210a, 212a of the combustor liner 210, 212, and may be oriented to discharge at various angles relative to the bulk combustor gas flow, such that a film of cooling air forms on the inner surface 210a, 212a of the respective combustor liner 210, 212, e.g., the surface facing the combustion chamber 214. The film of cooling air functions to protect the combustor liner 210, 212 from the elevated temperatures of the combustion gases. Effusion cooling may also be used in other components, including combustor domes, heat shields, and turbine components, and the effusion (or angled) cooling holes 300 discussed herein are applicable to those components, e.g., the effusion cooling holes 300 may be associated with the body of such components exposed to combustion gases to direct cooling air from a first (or outside) surface, through the body, and to a second (or inside) surface to form a film of cooling air over the respective component.

Given the relatively small size, conventional effusion cooling holes tend to become partially or completely blocked by particles (e.g., dust, sand, and/or debris) flowing through the engine. According to the principles of the present disclosure, the shape of the effusion cooling holes 300 reduces or eliminates the accumulation of sand, fine dust and/or debris particles within the effusion cooling holes 300, which ensures adequate cooling of the combustor liner 210, 212. Generally, the effusion cooling holes 300 each receive cooling fluid or air from a cooling fluid source associated with the gas turbine engine 100, such as a bypass duct, for example.

FIG. 3 is a cross-sectional view of one of the effusion cooling holes 300 associated with a combustor liner 302. The combustor liner 302 may correspond, as an example, to any portion of the outer or inner combustor liner 210, 212 of the combustor 208 of FIG. 2. In this example, the combustor liner 302 includes a first or cold surface 304 and an opposite second or hot surface 306. The combustor liner 302 may also have a thickness T defined between the cold surface 304 and the hot surface 306. In one example, the thickness T is about 0.010 inches to about 0.020 inches, and for example, about 0.015 inches. The thickness T defines an interior or wall 308 of the combustor liner 302. Stated another way, the wall 308 is defined and extends between the hot surface 306 and the cold surface 304. In one example, each of the effusion cooling holes 300 is defined only partially through the wall 308 of the combustor liner 302, with a portion of each of the effusion cooling holes 300 extending above the cold surface 304. In other words, a portion of each of the effusion cooling holes 300 is defined outside of the thickness T of the wall 308 and is positioned above the cold surface 304 such that the portion of the effusion cooling holes 300 is not defined within the thickness T of the wall 308.

It should be understood that each of the effusion cooling holes 300 associated with the combustor liner 302 is the same, and for ease of description a single one of the effusion cooling holes 300 will be described and illustrated herein. In this example, the effusion cooling hole 300 includes an inlet section 310, a bump proximate the inlet section 310 or inlet bump 312, a converging section 314, a metering section 316 and an outlet section 318. Additional portions or segments may be provided as necessary or desired. The effusion cooling hole 300 extends along a longitudinal axis LA, which is transverse or oblique to the cold surface 304. In this example, the longitudinal axis LA is at an angle of about 45 degrees relative to the cold surface 304.

In one example, the inlet section 310, the inlet bump 312, the converging section 314, a portion of the metering section 316 and a portion of the outlet section 318 are defined so as to be positioned exterior to or above the cold surface 304 of the combustor liner 302. Stated another way, the inlet section 310, the inlet bump 312, the converging section 314, a portion of the metering section 316 and a portion of the outlet section 318 are defined exterior of the wall 308 and outside of the thickness T of the wall 308. By defining the inlet section 310, the inlet bump 312, the converging section 314, a portion of the metering section 316 and a portion of the outlet section 318 outside of the wall 308, outside of the thickness T and exterior to the cold surface 304 of the combustor liner 302, the inlet section 310, the inlet bump 312, the converging section 314, a portion of the metering section 316 and a portion of the outlet section 318 may act as heat transfer fins, which further assist in cooling the combustor liner 302.

The inlet section 310 guides cooling fluid or air into the effusion cooling hole 300 and is spaced apart from the cold surface 304. The inlet section 310 is defined exterior to the wall 308, which enables a reduction in the thickness T. In one example, the inlet section 310 includes a fillet 320, a bellmouth 322 and defines an opening 324. With brief reference to FIGS. 4 and 5, the fillet 320 extends about a perimeter of the effusion cooling hole 300 that extends beyond the cold surface 304 so as to surround the portion of the effusion cooling hole 300 that is external to the cold surface 304 and the wall 308. As shown, the fillet 320 is defined along the interface of the cold surface 304 and the effusion cooling hole 300, and extends about an entirety of the perimeter of the effusion cooling hole 300 at the interface with the cold surface 304. The fillet 320 is generally concave, and in one example, the fillet 320 has a radius of curvature of about 0.005 inches to about 0.015 inches, and in one example, the fillet 320 is about 0.010 inches. The fillet 320 assists in the manufacturing of the effusion cooling hole 300 by providing an underlying structure for the building of the effusion cooling hole 300 through additive manufacturing. The fillet 320 also constrains thermal stresses as a thermal gradient may exists through the effusion cooling hole 300 and around the inlet section 310. With reference back to FIG. 3, a portion of the fillet 320 is defined adjacent to the cold surface 304 and transitions into the inlet bump 312.

The bellmouth 322 is defined about and surrounds the opening 324. The bellmouth 322 further assists in directing cooling fluid or air into the opening 324. The bellmouth 322 defines a raised surface that is a heat transfer device and also assists in cooling the combustor liner 302. The bellmouth 322 and the opening 324 are each defined so as to be asymmetrical with regard to the longitudinal axis LA. In one example, the bellmouth 322 and the opening 324 are defined along an axis A, which is transverse or oblique to the longitudinal axis LA. Generally, the bellmouth 322 and the opening 324 are defined along the axis A to accommodate and cooperate with the inlet bump 312, and to receive cooling fluid or air that has encountered the inlet bump 312. The axis A is spaced a height H1 above the cold surface 304, and in this example, the height H1 is about 0.02 inches (in.) to about 0.10 inches (in.), and for example, is about 0.06 inches (in.).

In one example, the opening 324 is elliptical in shape. The elliptical shape of the opening 324 enables the inlet section 310 to be as large as possible for a given area and density of the effusion cooling holes 300 on the combustor liner 302. The elliptical opening 324 also allows a large inlet area while enabling adjacent effusion cooling holes 300 to be situated more closely on the combustor liner 302, which enables the combustor liner 302 to be formed with a higher cooling density. By positioning the opening 324 off of the cold surface 304 and exterior to the wall 308, the thickness T of the combustor liner 302 may be reduced in between the effusion cooling holes 300 in order to reduce the weight and material associated with the combustor liner 302. In addition, the positioning of the opening 324 off of the cold surface 304 and exterior to the wall 308 further enables a cross-sectional area of the opening 324 to be increased.

Figure 4:
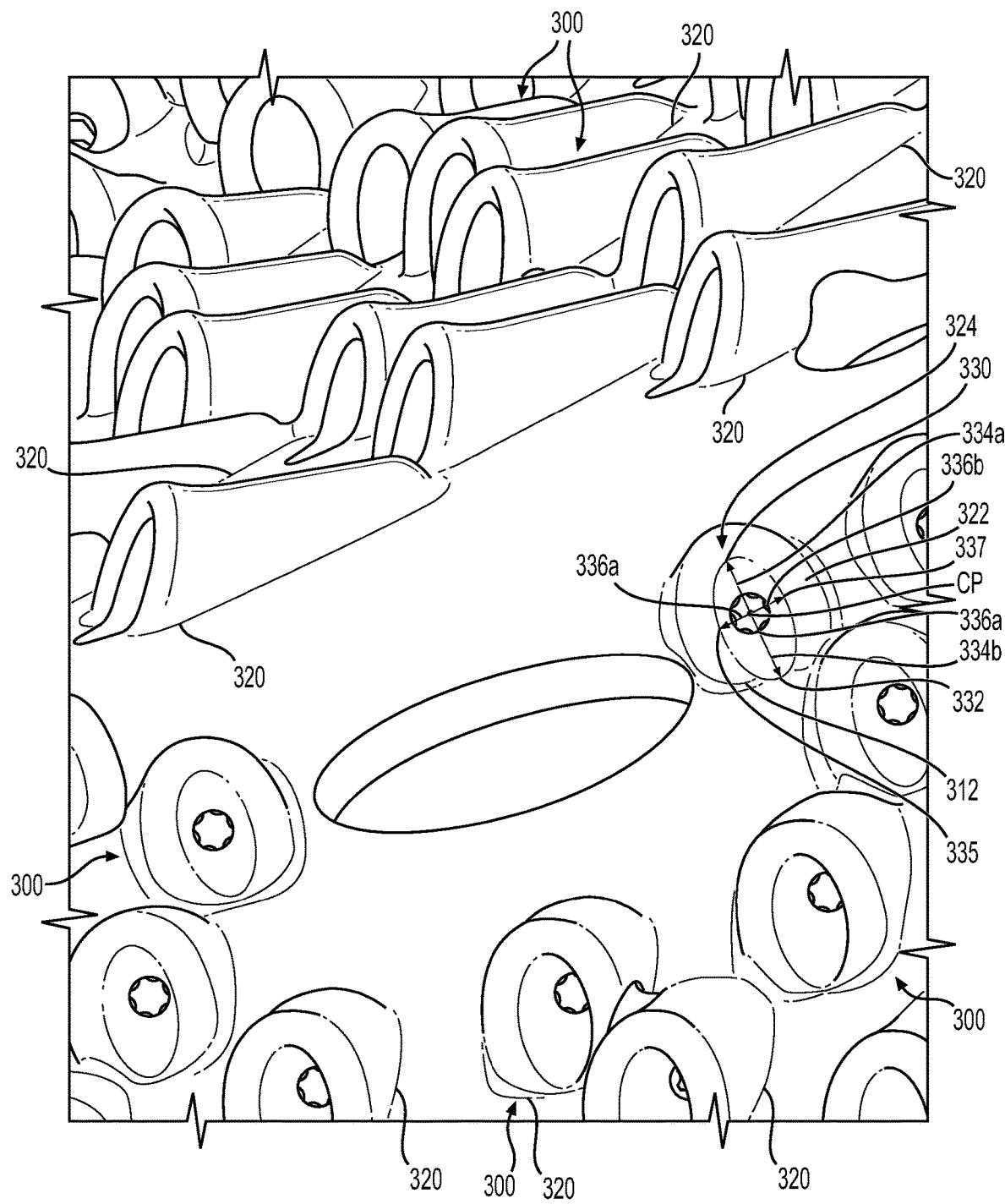
FIG. 4 is a detail view of a first, cold surface of the exemplary combustor liner, which includes a plurality of the plug resistant effusion cooling holes.

In this regard, with reference to FIG. 4, the opening 324 has a first vertex 330 proximate the fillet 320 and distalmost to the cold surface 304, and has a second vertex 332, opposite the first vertex 330. The second vertex 332 is proximate the inlet bump 312. A major axis 334 of the opening 324 is defined between the two vertices 330, 332. A semi-major axis 334a is defined between a center point CP and the first vertex 330; and a semi-major axis 334b is defined between the center point CP and the second vertex 332. The opening 324 also includes a third vertex 335 opposite a fourth vertex 337. A minor axis 336 is defined between the vertices 335, 337. The minor axis 336 includes a semi-minor axis 336a that extends between the center point CP and the third vertex 335; and a second semi-minor axis that extends between the center point CP and the fourth vertex 337. The orientation of the major axis 334 as transverse or oblique to the cold surface 304 provides for increased airflow into the opening 324. In one example, the major axis 334 is orientated at about 45 degrees relative to the cold surface 304. A cross-sectional area CA of the opening 324 is the product of the semi-major axis 334a, the semi-minor axis 336a and pi, which in one example, is about 0.0012 square inches (in$^2$) to about 0.0028 square inches (in$^2$). Generally, a cross-sectional area CA of the opening 324 is about twice a cross-sectional area CA1 of the metering section 316. In other examples, the cross-sectional area CA of the opening 324 is about four times the cross-sectional area CA1 of the metering section 316.

The elliptical shape of the opening 324 also directs the cooling fluid or air along a center of the effusion cooling hole 300, which reduces plugging of the effusion cooling hole 300 with sand, fine dust particles or debris. The greatest turning of airflow occurs in the cross-sectional plane of the bellmouth 322, and the turning causes sand, fine dust particles and/or debris to separate from the cooling fluid flow or airflow, which could cause the sand, fine dust particles or debris to deposit on the side walls of the effusion cooling hole 300. Thus, by providing the elliptical shape for the opening 324 of the inlet section 310 the opening 324 provides a larger distance in the direction of greatest turning of the cooling fluid flow or airflow, thereby reducing the propensity for sand, fine dust particles and/or debris to separate from the cooling fluid flow or airflow and adhere to the sides of the effusion cooling hole 300. Accordingly, the elliptical shape of the opening 324 reduces the accumulation of sand, fine dust particles and/or debris within the effusion cooling hole 300, by providing a larger distance in the direction of greatest turning, which increases the plug resistance of the effusion cooling hole 300. Generally, the inlet section 310, including the bellmouth 322 and the opening 324, is orientated such that an inlet plane P defined through the inlet section 310 and normal to the axis A is at an angle α relative to the cold surface 304. In one example, a is approximately 45 degrees in order to form a self-supported surface during additive manufacturing of the combustor liner 302. In the example of additive manufacturing, the build orientation of the combustor liner 302 is such that the bellmouth 322 of the inlet section 310 is on the bottom of the build.

With reference back to FIG. 3, the inlet bump 312 is defined between the fillet 320 and the bellmouth 322. The inlet bump 312 is defined off of or exterior to the cold surface 304 and the thickness T of the wall 308. The inlet bump 312 is proximate to the inlet section 310 and is upstream from the bellmouth 322 and the opening 324 to promote flow separation from the cold surface 304. Generally, the inlet bump 312 is convex and transitions into the bellmouth 322. The inlet bump 312 generally results from thinning the cold surface 304 in-between the effusion cooling holes 300 in order to reduce weight, but also serves to provide a uniform inlet condition at the bellmouth 322 inlet plane P that is normal to the axis A.

The converging section 314 is downstream of the inlet section 310. The converging section 314 is defined exterior to the wall 308, which also enables the reduction in the thickness T. The converging section 314 extends between the inlet section 310 and the metering section 316. The converging section 314 provides a smooth surface which is devoid of sharp edges to direct the cooling fluid or air into the metering section 316 while reducing the plugging of the effusion cooling hole 300. Generally, the converging section 314 transitions from an elliptical shape proximate the opening 324 to a circular shape proximate the metering section 316. In one example, the converging section 314 has a generally continuous reduction in cross-sectional area from the opening 324 to the metering section 316. For example, a cross-sectional area A1 (indicated with dashed lines) of the converging section 314 proximate the opening 324 is different, and greater than, a cross-sectional area A2 (indicated with dashed lines) of the converging section 314 proximate the metering section 316. The converging section 314 smoothly transitions or is devoid of bumps or protuberances from the first cross-sectional area A1 to the second cross-sectional area A2. It should be noted that the converging section 314 may have local increases or decreases in cross-section, if desired. Further, it should be noted that the converging section 314 may have some inflections or may not be smooth as the converging section 314 transitions from the inlet section 310 to the metering section 316. In this example, a second derivative of each unit length is continuous in the converging section 314 and every surface is pure tangent to an adjacent surface within the converging section 314.

The metering section 316 is downstream of the converging section 314. The metering section 316 is generally cylindrical, with a circular cross-section, and is substantially symmetric to the longitudinal axis LA. The metering section 316 includes a metering inlet 340 upstream from a metering outlet 342. The metering inlet 340 is spaced apart from the metering outlet 342 by a length L1. In one example, the length L1 is about 0.020 inches to about 0.050 inches long, and for example, is about 0.040 inches long. Generally, the metering inlet 340 is in fluid communication with the converging section 314, and the metering outlet 342 is in fluid communication with the outlet section 318. The metering inlet 340 is defined exterior to the cold surface 304 and the wall 308, while a portion of the metering outlet 342 is defined within the wall 308. By providing a portion of the metering section 316 outside of or external to the cold surface 304 and the wall 308, the thickness T of the wall 308 may be reduced.

The outlet section 318 is downstream of the metering section 316 and is in fluid communication with the metering outlet 342. The outlet section 318 includes an outlet inlet 344 and the outlet trough 338. The outlet inlet 344 is in fluid communication with the metering outlet 342. The outlet trough 338 dispenses the cooling fluid or air onto the hot surface 306 of the combustor liner 302. In one example, the outlet trough 338 is defined to provide the effusion cooling hole 300 with a minimum wall thickness T1 of about 0.010 inches to about 0.030 inches, and for example, about 0.020 inches. A length L2 of the outlet section 318 is defined within the wall 308, and in one example, L2 is about 0.005 inches to about 0.015 inches, and for example, is about 0.010 inches. In one example, the outlet section 318 may be substantially similar or the same as the effusion cooling aperture 400 described in commonly-assigned U.S. Publication No. 2018/0306114 (U.S. application Ser. No. 15/495, 663), titled "GAS TURBINE ENGINE COMPONENTS WITH AIR-COOLING FEATURES, AND RELATED METHODS OF MANUFACTURING THE SAME," and the relevant portion of this application is incorporated herein by reference. Thus, in this example, the outlet trough 338 includes a recessed portion 352, which is a void area beginning at the hot surface 306 and extending inwardly therefrom (in a direction toward the cold surface 304). The recessed portion 352 includes a forward surface 344a, which is oriented parallel to the inward direction (toward the cold surface 304). The forward surface 344a surrounds and contains the outlet inlet 344, through which cooling fluid or air flow F received through the inlet section 310, the converging section 314 and the metering section 316 exits into the recessed portion 352. The recessed portion 352 further includes an inward surface 354, which extends from the inward-most end 356 of the forward surface 344a to the hot surface 306, at point 358.

The inward surface 354 extends at an angle c, defined with reference to a hot gas flow path direction 360 (as well as the hot surface 306), which may be from about 20 degrees to about 70 degrees, such as about 30 degrees to about 60 degrees. Furthermore, the forward surface 344a defines an angle γ, defined with reference to the hot gas flow path direction 360 (as well as the hot surface 306), which is 90 degrees in some embodiments, or is greater than 90 degrees in other embodiments, such as from 91 degrees to 135 degrees. An entirety of the forward surface 344a is provided at the angle γ. The inward-most end 356 of the forward surface 344a, when measured against the hot surface 306, defines a distance D1 in the inward direction. Furthermore, the recessed portion 352 spans a distance D2 from the forward surface 344a to the point 358, defined with reference to the hot gas flow path direction 405 (as well as the hot surface 306). The distance D1 is different than the distance D2, and may be from about 20 percent to about 80 percent of distance D2, such as from about 30 percent to about 70 percent. In one example, the outlet section 318 further includes an overhang portion 366 that extends aftward over the recessed portion 352 beginning from the forward surface 344a. The overhang portion 366 defines the length L2 of the outlet section 318. The overhang portion 366 includes an outer surface 368, which is an extension of the hot surface 306 as it extends over the recessed portion 352. The outer surface 368 may be inclined with respect to the hot surface 306, if desired. The overhang portion 366 inhibits the plugging of the outlet inlet 344 during the application of an optional coating, such as a thermal barrier coating 350, discussed below.

Figure 5:
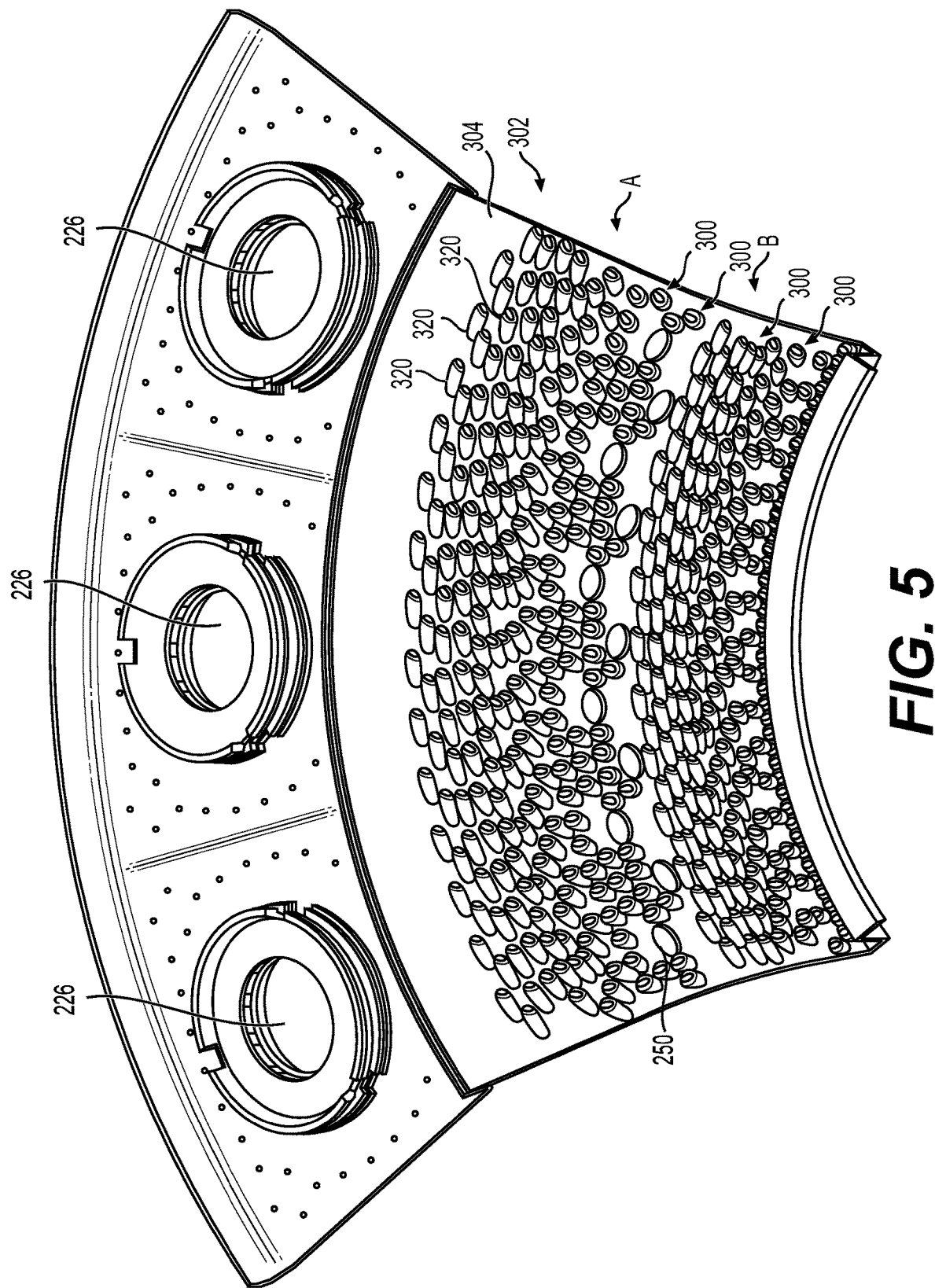
FIG. 5 is a sectional view of a portion of the first, cold surface of the exemplary combustor liner, which includes the plurality of plug resistant effusion cooling holes arranged with regard to two example airflows through the combustion section.
Figure 6:
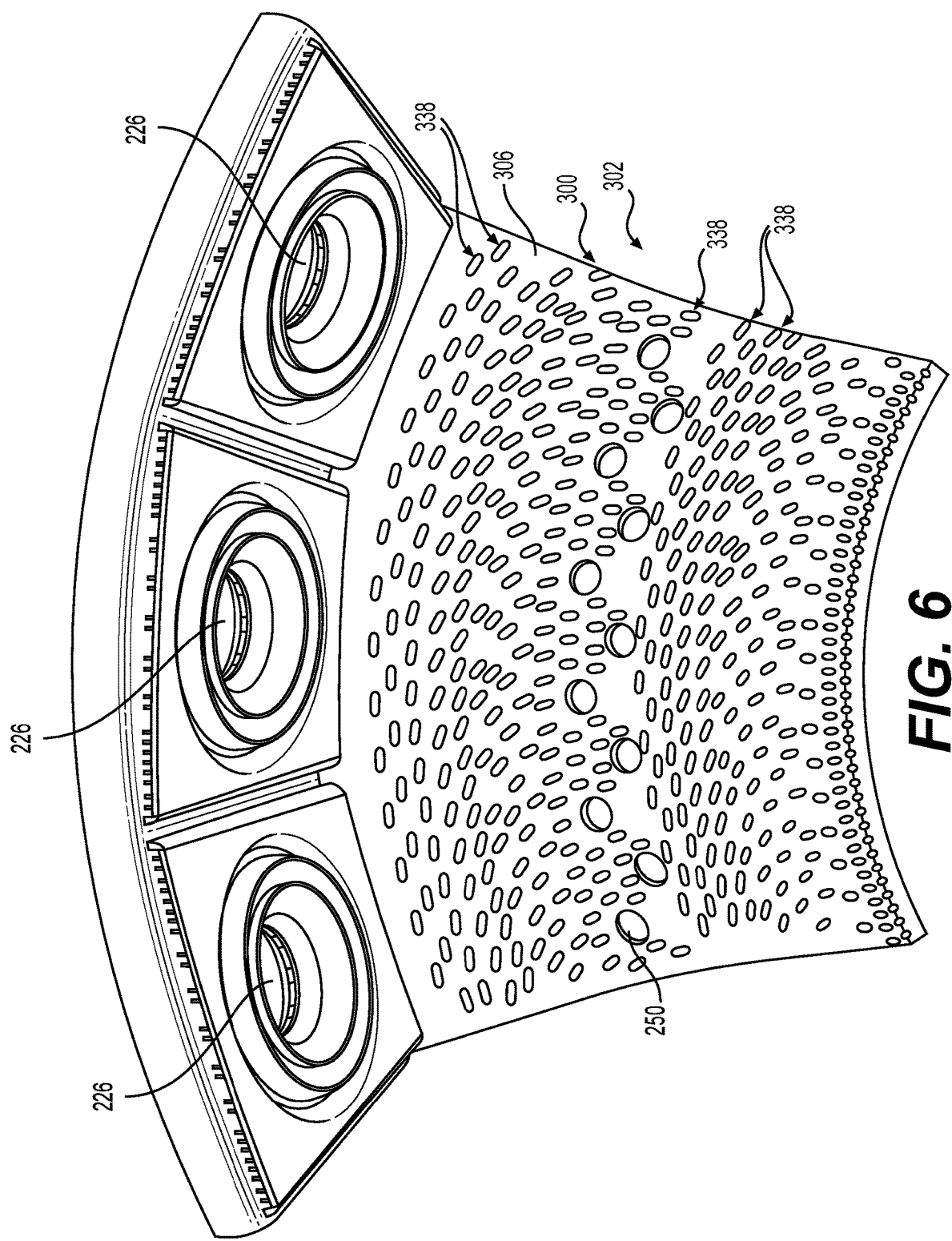
FIG. 6 is a sectional view of a portion of a second, hot surface of the exemplary combustor liner, which illustrates an outlet section associated with the plurality of plug resistant effusion cooling holes for forming a cooling film on the second, hot surface of the exemplary combustor liner.

Generally, the effusion cooling hole 300 may be oriented in any suitable direction relative to local or mainstream air flows A, B. With reference to FIG. 5, in one example, the effusion cooling holes 300 are orientated in a substantially clockwise orientation relative to the cold surface 304. In some exemplary embodiments, the effusion cooling hole 300 may be considered to have a first side (e.g., on the left in FIG. 5) and a second side (e.g., on the right in FIG. 5) with respect to this dimension. Based on the general orientation of the effusion cooling hole 300 relative to the cold surface 304, the first side may also be referred to as the obtuse side, and the second side may also be referred to as the acute side. The effusion cooling hole 300 may also be aligned with main flow B, or in any direction between A and B. As shown in FIG. 6, the outlet trough 338 of each of the effusion cooling holes 300 cooperates to form a film of cooling fluid over the hot surface 306 of the combustor liner 302.

In one example, the combustor liner 302 is formed with a plurality of the effusion cooling holes 300 extending exterior to the cold surface 304 and with the portion of the metering section 316 and the outlet section 318 extending through the wall 308 in a predetermined density and orientation to provide a predetermined amount of cooling for the combustor liner 302. In this example, the effusion cooling holes 300 and the combustor liner 302 are composed of a metal or metal alloy, including, but not limited to nickel or cobalt based alloys. The effusion cooling holes 300 and the combustor liner 302 are formed through additive manufacturing, including, but not limited to direct metal laser sintering (DMLS), laser powder bed fusion (L-PBF), electron powder bed fusion (E-PBF) or electron beam melting (EBM). In one example, the effusion cooling holes 300 and the combustor liner 302 are formed through additive manufacturing employing the method 500 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. The shape of the effusion cooling holes 300 enables the effusion cooling holes 300 to be self-supporting during formation through additive manufacturing. In addition, the position of the plane of the inlet section 310 and the fillet 320 assist in the formation of the effusion cooling holes 300 through additive manufacturing.

Optionally, with reference to FIG. 3, once the combustor liner 302 and the effusion cooling holes 300 are formed, a thermal barrier coating 350 may be applied to the hot surface 306 of the combustor liner 302. The thermal barrier coating 350 generally improves the heat resistance of the combustor liner 302 and the effusion cooling holes 300. In one example, the thermal barrier coating 350 comprises the thermal barrier coating 750 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. In this example, the thermal barrier coating 350 is applied by plasma spray coating, but it should be appreciated that other techniques may be employed to apply the thermal barrier coating 350. The application of the thermal barrier coating 350 to the hot surface 306 may result in the thermal barrier coating 350 covering a portion of the outlet trough 338. In one example, a spray vector V1 for applying the thermal barrier coating 350 is substantially parallel to a forward surface 344a of the outlet inlet 344. The length L2 of the outlet section 318 defined by the overhang portion 366 prohibits or prevents the thermal barrier coating 350 from plugging the effusion cooling holes 300.

Thus, the effusion cooling holes 300 associated with the combustor liner 302 (which corresponds to either or both of the combustor liners 210, 212) of the gas turbine engine 100 reduces plugging of the effusion cooling holes 300 with sand, fine dust particles or debris during the operation of the gas turbine engine 100 by providing a smooth transition between the inlet section 310, through the converging section 314, the metering section 316 and the outlet section 318. By providing the converging section 314 with a smooth surface that gradually transitions from the inlet section 310 to the metering section 316 and is devoid of bumps or protuberances, sand, fine dust particles and debris are not captured within the converging section 314, which reduces plugging of the effusion cooling holes 300. In one example, the plugging of the effusion cooling holes 300 is reduced by about 90% when compared to a conventional effusion hole. Further, by positioning the inlet section 310, the converging section 314, the portion of the metering section 316 and the portion of the outlet section 318 external to the wall 308 or outside of the thickness T of the wall 308, the thickness T of the wall 308 itself may be reduced, which reduces a weight of the combustor liner 302. The elliptical shape of the opening 324 of the inlet section 310 provides a larger flow capacity for the effusion cooling holes 300, and the inlet bump 312 encourages flow separation off of the cold surface 304 and into the respective one of the effusion cooling holes 300. Further, by providing the fillet 320 about each of the effusion cooling holes 300 along the interface of where each of the effusion cooling holes 300 extends from the cold surface 304 (or along the perimeter of each of the effusion cooling holes 300 along the cold surface 304), the fillet 320 of each of the effusion cooling holes 300 assists in the additive manufacturing of the effusion cooling holes 300, while constraining thermal stresses. In addition, the length L2 of the outlet section 318 enables the application of the thermal barrier coating 350 without plugging the respective one of the effusion cooling holes 300, if desired.

Figure 7A:
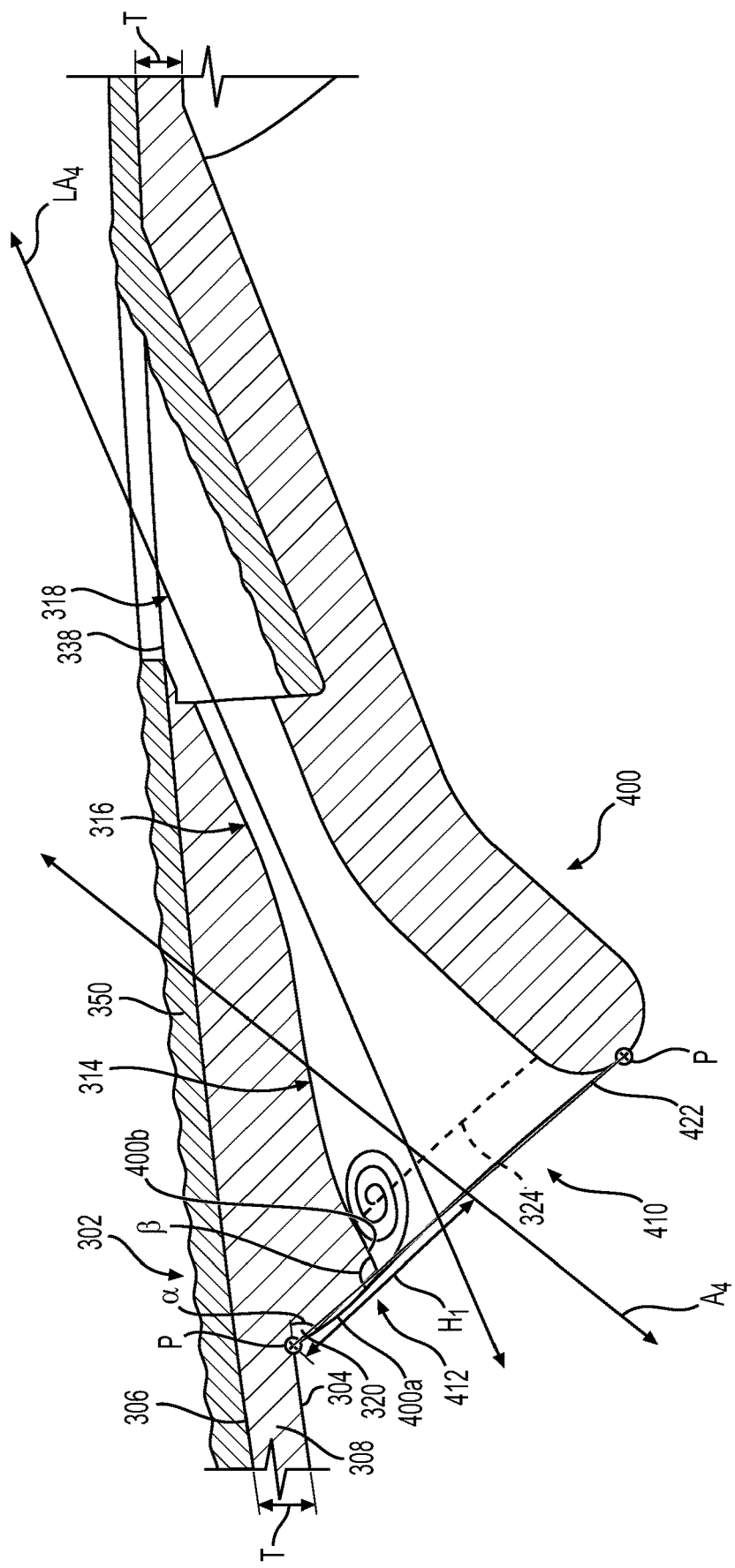
FIG. 7A is a cross-sectional view of another plug resistant effusion cooling hole for use with the exemplary combustor liner of the combustion section of FIG. 2 in accordance with various embodiments.

It should be noted that in other embodiments, one or more of the effusion cooling holes 300 associated with the combustor liner 302 may be configured differently to reduce plugging of the effusion cooling holes 300 with sand, fine dust particles or debris during the operation of the gas turbine engine 100. With reference to FIG. 7A, an effusion cooling hole 400 is shown. As the effusion cooling hole 400 may include some of the same features as the effusion cooling hole 300 discussed with regard to FIGS. 1-6, the same reference numerals will be used to denote the same features. In this example, the effusion cooling hole 400 includes an inlet section 410, a corner proximate the inlet section 410 or inlet corner 412, the converging section 314, the metering section 316 and the outlet section 318. Additional portions or segments may be provided as necessary or desired. The effusion cooling hole 400 extends along a longitudinal axis LA4, which is transverse or oblique to the cold surface 304. In this example, the longitudinal axis LA4 of the effusion cooling hole 400 is at an angle of about 45 degrees relative to the cold surface 304.

In one example, the inlet section 410, the inlet corner 412, the converging section 314, a portion of the metering section 316 and a portion of the outlet section 318 are defined so as to be positioned exterior to or above the cold surface 304 of the combustor liner 302. Stated another way, the inlet section 410, the inlet corner 412, the converging section 314, a portion of the metering section 316 and a portion of the outlet section 318 are defined exterior of the wall 308 and outside of the thickness T of the wall 308. By defining the inlet section 410, the inlet corner 412, the converging section 314, a portion of the metering section 316 and a portion of the outlet section 318 outside of the wall 308, outside of the thickness T and exterior to the cold surface 304 of the combustor liner 302, the inlet section 410, the inlet corner 412, the converging section 314, a portion of the metering section 316 and a portion of the outlet section 318 may act as heat transfer fins, which further assist in cooling the combustor liner 302.

The inlet section 410 guides cooling fluid or air into the effusion cooling hole 400 and is spaced apart from the cold surface 304. The inlet section 410 is defined exterior to the wall 308, which enables a reduction in the thickness T. In one example, the inlet section 410 includes the fillet 320, a partial bellmouth 422 and defines the opening 324. As discussed, the fillet 320 extends about a perimeter of the effusion cooling hole 300 that extends beyond the cold surface 304 so as to surround the portion of the effusion cooling hole 300 that is external to the cold surface 304 and the wall 308. A portion of the fillet 320 is defined adjacent to the cold surface 304 and transitions into the inlet corner 412.

The bellmouth 422 is defined about a portion of the circumference of the opening 324. In this example, the bellmouth 422 is interrupted by the inlet corner 412 such that the bellmouth 422 partially extends about the perimeter of the opening 324. The bellmouth 422 assists in directing cooling fluid or air into the opening 324. The bellmouth 422 also defines a raised surface that is a heat transfer device and also assists in cooling the combustor liner 302. The bellmouth 422 and the opening 324 are each defined so as to be asymmetrical with regard to the longitudinal axis. In one example, the bellmouth 422 and the opening 324 are defined along an axis A4, which is transverse or oblique to the longitudinal axis LA4. Generally, the bellmouth 422 and the opening 324 are defined along the axis A4 to accommodate and cooperate with the inlet corner 412, and to receive cooling fluid or air that has encountered the inlet corner 412. The axis A4 is spaced the height H1 above the cold surface 304.

As discussed, the opening 324 is elliptical in shape. The elliptical shape of the opening 324 also directs the cooling fluid or air along a center of the effusion cooling hole 400, which reduces plugging of the effusion cooling hole 400 with sand, fine dust particles or debris. Generally, the inlet section 410, including the bellmouth 422 and the opening 324, is orientated such that the inlet plane P defined through the inlet section 410 and normal to the axis A4 is at an angle α relative to the cold surface 304. In one example, a is approximately 45 degrees in order to form a self-supported surface during additive manufacturing of the combustor liner 302. In the example of additive manufacturing, the build orientation of the combustor liner 302 is such that the bellmouth 422 of the inlet section 410 is on the bottom of the build.

With reference back to FIG. 3, the inlet corner 412 is defined between the fillet 320 and interrupts the bellmouth 422. The inlet corner 412 is defined off of or exterior to the cold surface 304 and the thickness T of the wall 308. The inlet corner 412 is proximate to the inlet section 410 and is upstream from the opening 324 to promote flow separation from the cold surface 304. The inlet corner 412 is sharp corner, and may be defined by an angle β. The angle β is defined between a wall surface 400a of the respective effusion cooling hole 402 and an interior wall surface 400b of the respective effusion cooling hole 402. In one example, the angle β is about 85 to 95 degrees, and in this example, is about 90 degrees. By providing the inlet corner 412 on the side of the effusion cooling hole 400 that is closest to the cold surface 304, the cooling fluid or air is tripped, which causes separation and reduces impingement in the adjacent side of the of the effusion cooling hole 400.

The converging section 314 is downstream of the inlet section 410. The converging section 314 is defined exterior to the wall 308, which also enables the reduction in the thickness T. The converging section 314 extends between the inlet section 410 and the metering section 316. The metering section 316 is downstream of the converging section 314. The outlet section 318 is downstream of the metering section 316 and the outlet trough 338 dispenses the cooling fluid or air onto the hot surface 306 of the combustor liner 302.

Generally, the effusion cooling hole 400 may be oriented in any suitable direction relative to local or mainstream air flows. The outlet trough 338 of each of the effusion cooling holes 400 cooperates to form a film of cooling fluid over the hot surface 306 of the combustor liner 302. Similarly, in one example, the combustor liner 302 is formed with a plurality of the effusion cooling holes 400 extending exterior to the cold surface 304 and with the portion of the metering section 316 and the outlet section 318 extending through the wall 308 in a predetermined density and orientation to provide a predetermined amount of cooling for the combustor liner 302. In this example, the effusion cooling holes 400 and the combustor liner 302 are composed of a metal or metal alloy, including, but not limited to nickel or cobalt based alloys. The effusion cooling holes 400 and the combustor liner 302 are formed through additive manufacturing, including, but not limited to direct metal laser sintering (DMLS), laser powder bed fusion (L-PBF), electron powder bed fusion (E-PBF) or electron beam melting (EBM). The shape of the effusion cooling holes 400 enables the effusion cooling holes 400 to be self-supporting during formation through additive manufacturing. In addition, the position of the plane of the inlet section 410 and the fillet 320 assist in the formation of the effusion cooling holes 400 through additive manufacturing.

It should be noted that in other embodiments, one or more of the effusion cooling holes 300 associated with the combustor liner 302 may be configured differently to reduce plugging of the effusion cooling holes 300 with sand, fine dust particles or debris during the operation of the gas turbine engine 100. With reference to FIG. 7B, an effusion cooling hole 500 is shown. As the effusion cooling hole 500 may include some of the same features as the effusion cooling hole 300 discussed with regard to FIGS. 1-6, the same reference numerals will be used to denote the same features. In this example, the effusion cooling hole 500 includes an inlet section 510, the inlet bump 312, the converging section 314, the metering section 316 and the outlet section 318. Additional portions or segments may be provided as necessary or desired. The effusion cooling hole 500 extends along a longitudinal axis LA5, which is transverse or oblique to the cold surface 304. In this example, the longitudinal axis LA5 of the effusion cooling hole 500 is at an angle of about 45 degrees relative to the cold surface 304.

In one example, the inlet section 510, the inlet bump 312, the converging section 314, a portion of the metering section 316 and a portion of the outlet section 318 are defined so as to be positioned exterior to or above the cold surface 304 of the combustor liner 302. Stated another way, the inlet section 510, the inlet bump 312, the converging section 314, a portion of the metering section 316 and a portion of the outlet section 318 are defined exterior of the wall 308 and outside of the thickness T of the wall 308. By defining the inlet section 510, the inlet bump 312, the converging section 314, a portion of the metering section 316 and a portion of the outlet section 318 outside of the wall 308, outside of the thickness T and exterior to the cold surface 304 of the combustor liner 302, the inlet section 510, the inlet bump 312, the converging section 314, a portion of the metering section 316 and a portion of the outlet section 318 may act as heat transfer fins, which further assist in cooling the combustor liner 302.

The inlet section 510 guides cooling fluid or air into the effusion cooling hole 500 and is spaced apart from the cold surface 304. The inlet section 510 is defined exterior to the wall 308, which enables a reduction in the thickness T. In one example, the inlet section 510 includes the fillet 320, a bellmouth 522, an overhang 524 and defines the opening 324. As discussed, the fillet 320 extends about a perimeter of the effusion cooling hole 500 that extends beyond the cold surface 304 so as to surround the portion of the effusion cooling hole 500 that is external to the cold surface 304 and the wall 308. A portion of the fillet 320 is defined adjacent to the cold surface 304 and transitions into the inlet bump 312.

The bellmouth 522 is defined about a portion of the circumference of the opening 324. In this example, the bellmouth 522 is asymmetrical about an axis A5. The bellmouth 522 has a radius R5 at a first end 522a that is different, and in this example, less than a radius R6 of the bellmouth 522 at an opposite, second end 522b. The larger radius R5 of the bellmouth 522 provides less separation of the cooling fluid flow through the effusion cooling hole 500 on the first end 522a. The bellmouth 522 assists in directing cooling fluid or air into the opening 324. The bellmouth 522 also defines a raised surface that is a heat transfer device and also assists in cooling the combustor liner 302. The bellmouth 522 and the opening 324 are each defined so as to be asymmetrical with regard to the longitudinal axis LA5. In one example, the bellmouth 522 and the opening 324 are defined along the axis A5, which is transverse or oblique to the longitudinal axis LA5. Generally, the bellmouth 522 and the opening 324 are defined along the axis A5 to accommodate and cooperate with the inlet bump 312, and to receive cooling fluid or air that has encountered the inlet bump 312. The axis A5 is spaced the height H1 above the cold surface 304. The overhang 524 extends from the effusion cooling hole 500 proximate the first end 522a of the bellmouth 522. The overhang 524 is curved, and cooperates with the larger radius R5 of the bellmouth 522 at the first end 522a to reduce separation of the cooling fluid flow on the side of the effusion cooling hole 500 opposite the cold surface 304.

As discussed, the opening 324 is elliptical in shape. The elliptical shape of the opening 324 also directs the cooling fluid or air along a center of the effusion cooling hole 500, which reduces plugging of the effusion cooling hole 500 with sand, fine dust particles or debris. Generally, the cross-sectional area CA of the opening 324 is about twice a cross-sectional area CA1 of the metering section 316. In other examples, the cross-sectional area CA of the opening 324 is about four times the cross-sectional area CA1 of the metering section 316. Generally, the inlet section 510, including the bellmouth 522 and the opening 324, is orientated such that the inlet plane P defined through the inlet section 510 and normal to the axis A5 is at an angle α relative to the cold surface 304. In one example, α is approximately 45 degrees in order to form a self-supported surface during additive manufacturing of the combustor liner 302. In the example of additive manufacturing, the build orientation of the combustor liner 302 is such that the bellmouth 522 of the inlet section 510 is on the bottom of the build.

The inlet bump 312 is defined between the fillet 320 and the bellmouth 522. The inlet bump 312 is proximate to the inlet section 510 and is upstream from the bellmouth 322 and the opening 324 to promote flow separation from the cold surface 304 proximate the second end 522b of the bellmouth 522. Generally, the inlet bump 312 is convex and transitions into the bellmouth 522.

The converging section 314 is downstream of the inlet section 510. The converging section 314 is defined exterior to the wall 308, which also enables the reduction in the thickness T. The converging section 314 extends between the inlet section 510 and the metering section 316. The metering section 316 is downstream of the converging section 314. The outlet section 318 is downstream of the metering section 316 and the outlet trough 338 dispenses the cooling fluid or air onto the hot surface 306 of the combustor liner 302.

Generally, the effusion cooling hole 500 may be oriented in any suitable direction relative to local or mainstream air flows. The outlet trough 338 of each of the effusion cooling holes 500 cooperates to form a film of cooling fluid over the hot surface 306 of the combustor liner 302. Similarly, in one example, the combustor liner 302 is formed with a plurality of the effusion cooling holes 500 extending exterior to the cold surface 304 and with the portion of the metering section 316 and the outlet section 318 extending through the wall 308 in a predetermined density and orientation to provide a predetermined amount of cooling for the combustor liner 302. In this example, the effusion cooling holes 500 and the combustor liner 302 are composed of a metal or metal alloy, including, but not limited to nickel or cobalt based alloys. The effusion cooling holes 500 and the combustor liner 302 are formed through additive manufacturing, including, but not limited to direct metal laser sintering (DMLS), laser powder bed fusion (L-PBF), electron powder bed fusion (E-PBF) or electron beam melting (EBM). The shape of the effusion cooling holes 500 enables the effusion cooling holes 500 to be self-supporting during formation through additive manufacturing. In addition, the position of the plane of the inlet section 510 and the fillet 320 assist in the formation of the effusion cooling holes 500 through additive manufacturing.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A combustor for a gas turbine engine, comprising:
   a first liner having a first surface, a second surface opposite the first surface, and a wall having a thickness that extends between the first surface and the second surface;
   a second liner forming a combustion chamber with the first liner, the combustion chamber configured to receive an air-fuel mixture for combustion;
   the first liner defining a plurality of effusion cooling holes configured to form a film of cooling fluid on the second surface of the first liner, at least one of the plurality of effusion cooling holes including:
      an inlet section spaced apart from the first surface, the inlet section including a bellmouth defined about an elliptical opening, with a major axis of the opening oblique to a longitudinal axis of the at least one of the plurality of effusion cooling holes and oblique to the first surface, the bellmouth and the opening defined along an axis, and a plane extending through the inlet section is at an angle to the first surface and normal to the axis, and the angle is less than 90 degrees;
      a converging section fluidly coupled downstream of the inlet section, the inlet section and the converging section defined off of the first surface so as to be outside of the thickness of the wall;
      a metering section fluidly coupled downstream of the converging section and a portion of the metering section is defined within the thickness of the wall; and
      an outlet section fluidly coupled downstream of the metering section, the outlet section positioned proximate to the second surface and configured to form the film of cooling air on the second surface, and the inlet section, the converging section, the metering section and the outlet section extend along the longitudinal axis, with the inlet section asymmetrical relative to the longitudinal axis and the metering section symmetrical relative to the longitudinal axis.

2. The combustor of claim 1, wherein the at least one of the plurality of effusion cooling holes includes a bump proximate the inlet section to separate cooling fluid from the first surface.

3. The combustor of claim 1, wherein the converging section has a first cross-sectional area proximate the inlet section and smoothly transitions to a second cross-sectional area at the metering section.

4. The combustor of claim 1, wherein the at least one of the plurality of effusion cooling holes includes a fillet that extends about a perimeter of the at least one of the plurality of effusion cooling holes at the first surface.

5. The combustor of claim 1, wherein a cross-sectional area of the inlet section is greater than a cross-sectional area of the outlet section.

6. The combustor of claim 1, wherein a portion of the outlet section is defined within the thickness of the wall.

7. A combustor for a gas turbine engine, comprising:
   a first liner having a first surface, a second surface opposite the first surface, and a wall having a thickness defined between the first surface and the second surface;
   a second liner forming a combustion chamber with the first liner, the combustion chamber configured to receive an air-fuel mixture for combustion;
   the first liner defining a plurality of effusion cooling holes configured to form a film of cooling fluid on the second surface of the first liner, at least one of the plurality of effusion cooling holes including:
      an inlet section spaced apart from the first surface, the inlet section including a bellmouth defined about an elliptical opening, with a major axis of the opening oblique to a longitudinal axis of the at least one of the plurality of effusion cooling holes and oblique to the first surface, the bellmouth and the opening defined along an axis, and a plane extending through the inlet section is at an angle to the first surface and normal to the axis, and the angle is less than 90 degrees;
      a converging section fluidly coupled downstream of the opening, the inlet section and the converging section defined off of the first surface so as to be outside of the thickness of the wall;
      a metering section fluidly coupled downstream of the converging section and a portion of the metering section is defined within the thickness of the wall; and
      an outlet section fluidly coupled downstream of the metering section, a portion of the outlet section defined within the thickness of the wall, the outlet section positioned proximate to the second surface and configured to form the film of cooling air on the second surface, and the inlet section, the converging section, the metering section and the outlet section extend along the longitudinal axis, with the inlet section asymmetrical relative to the longitudinal axis and the metering section symmetrical relative to the longitudinal axis.

8. The combustor of claim 7, wherein the at least one of the plurality of effusion cooling holes includes a bump proximate the inlet section to separate cooling fluid from the first surface.

9. The combustor of claim 7, wherein the converging section has a first cross-sectional area proximate the opening of the inlet section and smoothly transitions to a second cross-sectional area at the metering section.

10. The combustor of claim 7, wherein the at least one of the plurality of effusion cooling holes includes a fillet that extends about a perimeter of the at least one of the plurality of effusion cooling holes at the first surface.

11. The combustor of claim 7, wherein a cross-sectional area of the inlet section is greater than a cross-sectional area of the outlet section.

12. A combustor for a gas turbine engine, comprising:
   a first liner having a first surface, a second surface opposite the first surface, and a wall having a thickness that extends between the first surface and the second surface;

a second liner forming a combustion chamber with the first liner, the combustion chamber configured to receive an air-fuel mixture for combustion;

the first liner defining a plurality of effusion cooling holes configured to form a film of cooling fluid on the second surface of the first liner, at least one of the plurality of effusion cooling holes including:

an inlet section spaced apart from the first surface, the inlet section including a bellmouth defined about an opening and the opening is elliptical, with a major axis of the opening oblique to a longitudinal axis of the at least one of the plurality of effusion cooling holes, the major axis having a first vertex and a second vertex opposite the first vertex, the bellmouth and the opening defined along an axis, and a plane extending through the inlet section is at an angle to the first surface, is normal to the axis and is normal to the major axis of the opening, and the angle is less than 90 degrees;

a bump proximate the bellmouth of the inlet section and proximate the second vertex;

a converging section fluidly coupled downstream of the opening, the inlet section and the converging section defined off of the first surface such that the converging section and the inlet section are positioned above the first surface and are external to the thickness of the wall to form a heat transfer fin;

a metering section fluidly coupled downstream of the converging section and a portion of the metering section is defined within the thickness of the wall; and an outlet section fluidly coupled downstream of the metering section, a portion of the outlet section defined within the thickness of the wall, the outlet section positioned proximate to the second surface and configured to form the film of cooling air on the second surface and the inlet section, the converging section, the metering section and the outlet section extend along the longitudinal axis, with the inlet section asymmetrical relative to the longitudinal axis and the metering section symmetrical relative to the longitudinal axis.

13. The combustor of claim 12, wherein the at least one of the plurality of effusion cooling holes includes a fillet that extends about a perimeter of the at least one of the plurality of effusion cooling holes at the first surface.

\* \* \* \* \*